April 10, 1934.   J. KITCHIN   1,954,081
GLARE SHIELD
Filed March 15, 1933
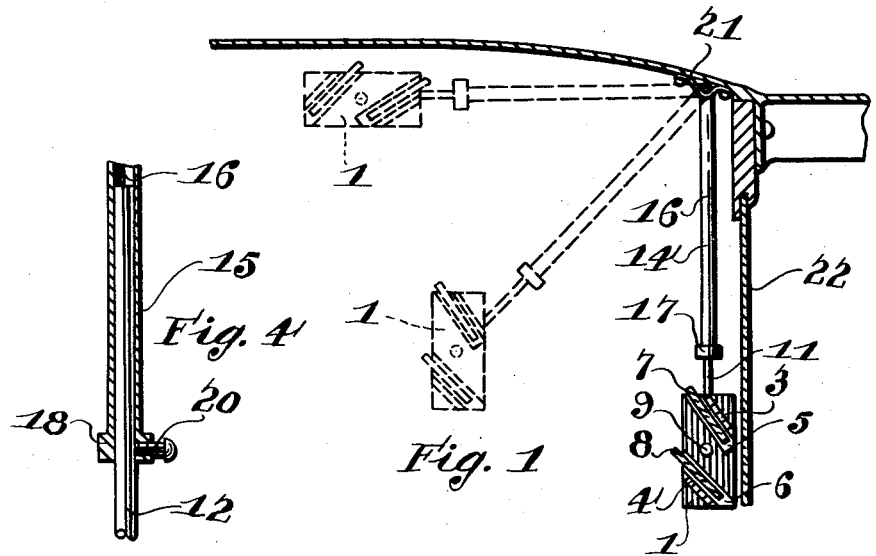
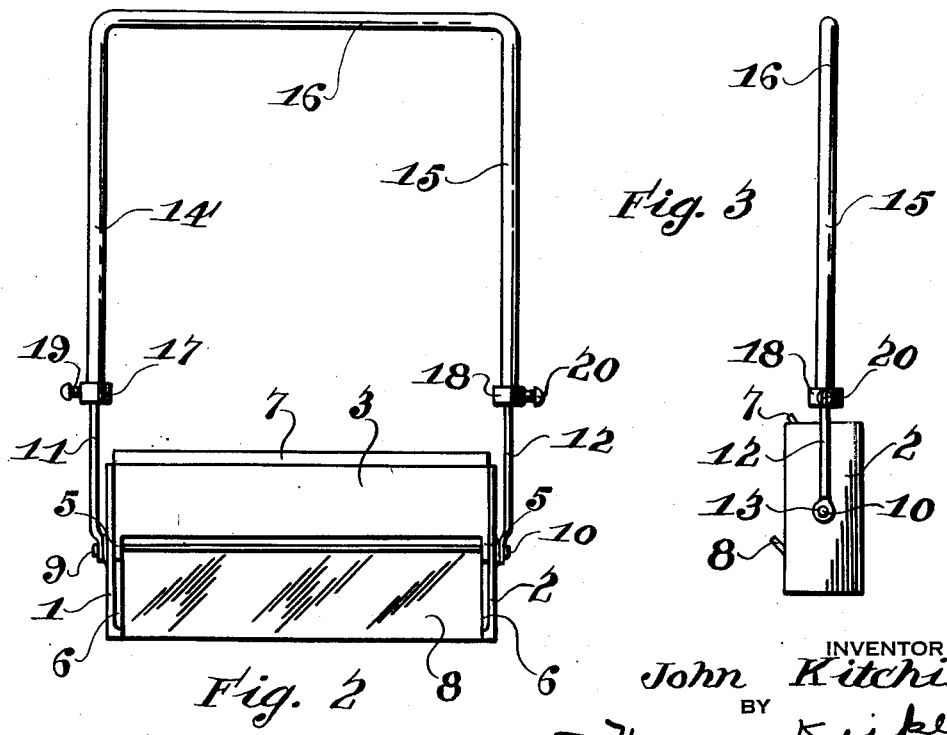
INVENTOR
John Kitchin
BY
ATTORNEY Patented Apr. 10, 1934

1,954,081

UNITED STATES PATENT OFFICE 1,954,081

GLARE SHIELD

John Kitchin, Rochester, N. Y., assignor to John F. Smith, Rochester, N. Y.

Application March 15, 1933, Serial No. 660,894

2 Claims. (Cl. 296—97)

The object of this invention is to provide a new and improved type of glare shield to protect the eyes of a driver of an automobile from the glare of an oncoming headlight at night or from the sun in the day time.

Another object of the invention is to provide a glare shield that can be quickly put in place to intercept the glare, and then as quickly removed to leave the view unobstructed.

Another object of the invention is to provide a glare shield that will reduce the glare by the use of a series of dark reflecting surfaces which absorb the intense light and reflect only a portion of the rays bent from their normal path.

Another object of the invention is to provide a frame that will hold the reflecting surfaces in the proper relation to each other and in proper relation to the eyes of the driver.

These and other objects of the invention will be illustrated in the drawing, described in the specification, and pointed out in the claims at the end thereof.

In the drawing:

Figure 1 shows a vertical transverse section through the top and front of an enclosed car, with the glare shield in position.

Figure 2 is a front elevation of the glare shield and support.

Figure 3 is a side elevation of Figure 2.

Figure 4 is a detail view of the adjustable support for the glare shield frame, the support being partly broken away and shown partly in section.

In the drawing like reference numerals indicate like parts.

In the drawing reference numerals 1 and 2 indicate the sides of a frame which are held together by the cross-ribs 3 and 4. The two sides and the two cross-ribs are made of one casting. The long ribs 3 and 4 extend clear across between the upright plates and connect the upright plates together, and are integral therewith. On each plate, parallel to and under the cross-rib 3, is a short rib 5, and above the cross-rib 4 is a short rib 6. The short rib 5 is parallel to the long rib 3, and the short rib 6 is parallel to the long rib 4, and the short ribs are suitably spaced apart from the long ribs so as to form a pocket or groove, closed at the lower end, which pockets are adapted to hold the ends of the reflecting plates 7 and 8. Each side plate is provided with a pivot 9 and 10 which are engaged with links 11 and 12, which links are provided with eyes 13 in the lower end thereof. These links have a sliding engagement with the two sides 14 and 15 of the tubular support 16. On the lower ends of the sides 14 and 15 are provided the bosses 17 and 18, which are adapted to carry the set screws 19 and 20, by which the links are clamped in place therein.

The tubular support or frame 16 is mounted to swing in brackets 21 fastened at the top of the car. For the purpose of protection to the eyes the glare shield normally stands in the upright position shown in Figure 1, and can be swung from that position to the horizontal position at the top of the car, shown in Figure 1, where it is out of the road. As shown in Figure 1, the glare shield can be close to the windshield 22, or it can be placed back therefrom, as shown in the intermediate dotted line position, in which case the frame 1 will be rather close to the eyes of the driver; while in the full line position, near the windshield, the glare shield will be two or three feet from the eyes of the driver.

In operation, the plates 7 and 8 of the glare shield will intercept all the direct rays that would ordinarily blind the driver. The rays which strike the upper face of the reflector 8 will be thrown up, in accordance with the well known law of optics that the angle of incidence is equal to the angle of reflection. The reflected rays will strike the lower surface of the reflector 7 and will be thereby reflected rearwardly to the eyes of the driver.

The reflectors 7 and 8 are both made of an opaque material, preferably black, that can be finished with a highly polished surface capable of reflecting very efficiently, as such black surfaces are understood.

It will also be understood that the reflection is from the upper surface of the reflector 8, and from the lower surface of the reflector 7; that is, from the front of each reflector, and not from the back of it. Double reflection or confusion is thereby prevented.

It will also be understood that when the rays strike the plate 8, a large percentage of them will be absorbed by the black color of the plate, but a portion of the rays will be thrown up to the reflecting surface of the plate 7, which will also absorb a percentage of the rays thrown against it, and the balance of the rays will be reflected back, and these rays will be sufficient to carry to the eyes of the driver a complete well-defined image of the headlights or the sun that causes the glare, as well as an image of the foreground, which image, however, will not blind him, and will leave his vision otherwise unimpaired.

It is obvious from an inspection of Figure 1 that the reflecting surfaces of the plates are not parallel to each other, but stand in planes that are diverging upwardly from each other. The reflecting surface of the lower reflecting surface normally stands at an angle of about 45 degrees from the horizontal, and the planes of the two reflecting surfaces converge together and enclose between them an angle of about ten or eleven degrees, this relation of plates being found to give the best results.

In practice the reflecting plates are each about seven inches long, and the lower plate about two inches wide, and the upper plate a little wider. These dimensions have been found to sufficiently shade the eyes from the glare, and yet give a range of vision to the driver that is sufficient to meet all requirements.

If the plates are placed in parallel relation, I have found that the lower plate cuts off part of the image as it appears reflected in the upper plate. By rotating the upper plate slightly out of parallel, all, or nearly all, of the image is exposed in the reflecting surface of the upper plate, and good vision thereof is secured without any blinding effect from the source of light.

As shown in the intermediate position in Figure 1, the glare shield is moved rather close to the eyes of the operator, so that it covers a larger angle of vision than if placed close to the windshield, and also brings a close-up view of the image as it appears in the reflecting surface 7.

When the glare shield is no longer needed, it can be swung up to the top of the car and held in an out-of-the-way position in any suitable manner.

While the glare shield is in use, it will always be placed directly in line between the source of light causing the glare and the eyes of the driver. By rotating the glare shield on the pivots 9 and 10, the quantity of light that comes through can be varied. By turning the upper reflecting surface away from the eyes, the amount of light that comes through is diminished, because the upper plate 7 cuts off more or less light from the reflecting surface of the lower plate. By turning the upper reflecting surface toward the eyes, the amount of light that comes through is increased, because the lower reflecting surface is more exposed to the light.

I claim:

1. A glare shield having a frame comprising two parallel side members, ribs integral therewith connecting them together and spacing them apart, two black reflecting surfaces supported between said uprights and between said ribs, each in a diagonal position, one above the other and facing each other, with an open space between them, said reflecting surfaces being divergent upwardly, one of said surfaces being adapted to receive horizontal rays and reflect them to the other surface, the other surface being adapted to receive the reflected rays and reflect them rearwardly the lower edge of the upper reflecting surface and the upper edge of the lower reflecting surface intersecting the same horizontal plane sufficiently to prevent any horizontal rays from passing through between them, the frame being mounted to tilt on a horizontal axis to vary the amount of light that is reflected from the one reflecting surface to the other.

2. A glare shield having a frame comprising two parallel side members, ribs integral therewith connecting them together and spacing them apart, two black reflecting surfaces supported between said uprights and between said ribs, each in a diagonal position, one above the other and facing each other, with an open space between them, said reflecting surfaces being divergent upwardly, one of said surfaces being adapted to receive horizontal rays and reflect them to the other surface, the other surface being adapted to receive the reflected rays and reflect them rearwardly, a swinging support on which said frame is mounted to swing, with which it can be moved toward and away from the driver, and on which it can be held in a vertical position, or swung from the vertical position on a horizontal axis to vary the amount of light that is reflected from the one reflecting surface to the other.

JOHN KITCHIN.